United States Patent [19]

Tsuchida et al.

[11] Patent Number: 4,606,318
[45] Date of Patent: Aug. 19, 1986

[54] FUEL INJECTION CONTROL SYSTEM FOR INTERNAL COMBUSTION ENGINE

[75] Inventors: Tsuyoshi Tsuchida; Yoshinobu Kido, both of Hiroshima, Japan

[73] Assignee: Mazda Motor Corporation, Hiroshima, Japan

[21] Appl. No.: 498,326

[22] Filed: May 26, 1983

[30] Foreign Application Priority Data

May 28, 1982 [JP] Japan ................... 57-91104

[51] Int. Cl.$^4$ ............ F02B 3/00; G01F 1/32
[52] U.S. Cl. ............... 123/488; 73/861.23; 73/861.02; 123/494
[58] Field of Search ......... 73/861.22, 861.23, 861.02, 73/861.04, 118, 861.24; 123/494, 488

[56] References Cited

U.S. PATENT DOCUMENTS

| | | | |
|---|---|---|---|
| 3,818,877 | 6/1974 | Barrera et al. | 123/494 |
| 4,033,188 | 7/1977 | Herzl | 73/861.24 |
| 4,297,894 | 11/1981 | Nagaishi | 73/861.03 |
| 4,433,663 | 2/1984 | Asayama | 73/861.22 |

OTHER PUBLICATIONS

Barnicoat et al, "An Automotive Mass Airflow Sensor" *Int. Conf. on Automotive Elec.*, 11/79, pp. 150–154.

*Primary Examiner*—Herbert Goldstein
*Attorney, Agent, or Firm*—Gerald J. Ferguson, Jr.; Michael P. Hoffman; James E. Bryan

[57] ABSTRACT

A Karman vortex generator is disposed in the air intake passage of an internal combustion engine. The frequency of the Karman vortex generated by the generator is detected by a Karman vortex frequency detector to measure the flow rate of intake air. The frequency of the Karman vortex is in proportion to the flow rate of intake air with a Strouhal number being the constant of proportionality thereof. However, when the flow rate or the flow velocity of intake air is within a certain range, the Strouhal number fluctuates and the proportionality between the Strouhal number and the flow rate of intake air is broken. This range is shifted when the kinematic viscosity of intake air changes. The kinematic viscosity of intake air depends upon the temperature thereof. Thus, the temperature of intake air is detected, and the output of the Karman vortex frequency detector is corrected when the air flow velocity represented by the output of the Karman vortex frequency detector is in such a range as to vary the Strouhal number taking into account the shift of such range due to the change of the kinematic viscosity of intake air.

2 Claims, 9 Drawing Figures

FUEL INJECTION CONTROL SYSTEM FOR INTERNAL COMBUSTION ENGINE

BACKGROUND OF THE INVENTION

1. Field of the Invention

This invention relates to an intake air flow rate detecting device for an internal combustion engine, and more particularly to an intake air flow rate detecting device for detecting the flow rate of intake air using a Karman vortex flowmeter.

2. Description of the Prior Art

There is an increasing demand for an intake air flow rate detecting device which can detect the flow rate of intake air with a high accuracy in order to effect various controls in an internal combustion engine, e.g., control of the amount of fuel to be injected.

There has been proposed, in Japanese Unexamined Patent Publication No. 56(1981)-167824, an intake air flow rate detecting device utilizing a Karman vortex flowmeter. As is well known, the Karman vortex flowmeter generates an output having a frequency corresponding to a Karman vortex frequency f the value of which is given by the following equation wherein the air flow velocity, the width of a trail generator and the Strouhal number are respectively represented by V, d and Sr.

$$f = Sr \times V/d$$

By detecting the Karman vortex frequency f, the air flow velocity V can be known and accordingly the flow rate Q of intake air (Q=AV, A representing the cross sectional area of the flow passage) can be known.

The said Strouhal number Sr varies with the Reynolds number Re and the relation therebetween is shown in FIG. 1. Further, the Reynolds number Re varies according to the air flow velocity V and the kinematic viscosity $\nu$ of intake air and when the internal diameter of the flowmeter is represented by D, the value of the Reynolds number Re is given by the following equation.

$$Re = V \times D/\nu$$

When the Reynolds number Re is held within the region A in FIG. 1, the Strouhal number Sr is kept substantially constant, and accordingly the flow rate Q of intake air can be determined with accuracy to some extent even if changes of the air flow velocity V and the kinematic viscosity $\nu$ should be neglected. However, in an engine installed on a vehicle, the flow rate Q of intake air varies over a very wide range from the minimum during idling to the maximum during full throttle travel, and the air flow velocity V also varies over a wide range. Accordingly, the value of the Reynolds number Re cannot be held within the region A of FIG. 1 and varies over a wide range out of the region A into the region B of FIG. 1 where the value of the Strouhal number Sr changes significantly according to the value of the Reynolds number Re.

As can be seen from the foregoing description, the flow rate Q of intake air can be known by way of the Karman vortex frequency f since the Karman vortex frequency f is in proportion to the air flow velocity V (and accordingly to the flow rate Q) with the Strouhal number Sr being the constant of proportionality. However the proportionality between the Karman vortex frequency f and the flow rate Q is broken, as shown in the region C in FIG. 2, when the flow rate Q is in such a range as to give a Reynolds number Re within the region B. In order to compensate for the fluctuation in the Strouhal number Sr due to the change of the air flow velocity V or the flow rate Q, conventionally, there has been effected a correction, when a Karman vortex frequency f corresponding to a flow rate Q in such a range as to fluctuate the Strouhal number Sr is obtained, to reduce the obtained Karman vortex frequency f or to reduce the width of a fuel injecting pulse as shown in FIG. 3 when the amount of fuel to be injected is controlled on the basis of the Karman vortex frequency f representing the flow rate Q. See Japanese Unexamined Patent Publication described above.

However, the Reynolds number Re is affected not only by the air flow velocity V but also by the kinematic viscosity $\nu$ of intake air as described above. That is, the kinematic viscosity $\nu$ also affects the Strouhal number Sr. Therefore, the flow rate Q of intake air cannot be measured with a high accuracy without taking into account the fluctuation in the Strouhal number Sr due to the change of the kinematic viscosity $\nu$ of intake air.

SUMMARY OF THE INVENTION

In view of the foregoing observations and description, the primary object of the present invention is to provide an intake air flow rate detecting device in which the fluctuation in the Strouhal number Sr resulting from the change of the kinematic viscosity $\nu$ as well as from the change of the air flow velocity V is compensated for, whereby the flow rate Q of intake air can be detected with a higher accuracy.

The intake air flow rate detecting device for detecting the flow rate of intake air introduced into an internal combustion engine in accordance with the present invention comprises a Karman vortex generator disposed in an air intake passage of the engine, a Karman vortex frequency detecting means for detecting the frequency of the Karman vortices generated downstream of the Karman vortex generator, an intake air temperature detecting means for detecting the temperature of intake air, and a compensating means which receives output signals of the Karman vortex frequency detecting means and the intake air temperature detecting means and compensates the output signal of the Karman vortex frequency detecting means for changes in the Strouhal number inherent to the air flow velocity corresponding to the Karman vortex frequency represented by the output signal of the Karman vortex frequency detecting means and for change of the same due to the kinematic viscosity of intake air inherent to the temperature of intake air represented by the output signal of the intake air temperature detecting means.

The compensation for the changes of the Strouhal number may be applied to the direct output signal of the Karman vortex frequency detecting means or to various control signals generated based on the output signal of the Karman vortex frequency detecting means. For example, when a fuel injecting signal is generated to control the amount of fuel to be injected based on the flow rate Q of intake air as represented by the output signal of the Karman vortex frequency detecting means, the compensation may be applied to the fuel injecting signal instead of to the direct output signal of the Karman vortex frequency detecting means. Therefore the term "output signal of the Karman vortex frequency detecting means" should be broadly interpreted to include various control signals generated based on the output signal of the Karman vortex detecting means for controlling the internal combustion engine or a system employing the internal combustion engine.

The kinematic viscosity $\nu$ of air increases with the increase in the temperature of the air as shown in FIG. 4, and accordingly the Reynolds number Re decreases as the temperature of intake air increases as shown in FIG. 5. The temperature t of intake air fluctuates over a wide range particularly when a supercharger is being operated and accordingly the kinematic viscosity $\nu$ of intake air also fluctuates over a wide range. For example, when the temperature of air changes from 0° C. to 60° C. under the atmospheric pressure, the kinematic viscosity $\nu$ of the air changes from 13.22 St to 18.85 St. Thus, it is necessary to compensate for the change of the Strouhal number Sr due to the change of the kinematic viscosity $\nu$ of intake air in order to detect the flow rate Q of intake air with a high accuracy. The kinematic viscosity $\nu$ of intake air can be known by detecting the temperature t of the intake air as can be seen from FIG. 4.

DESCRIPTION OF THE PREFERRED EMBODIMENT

Figure 6:
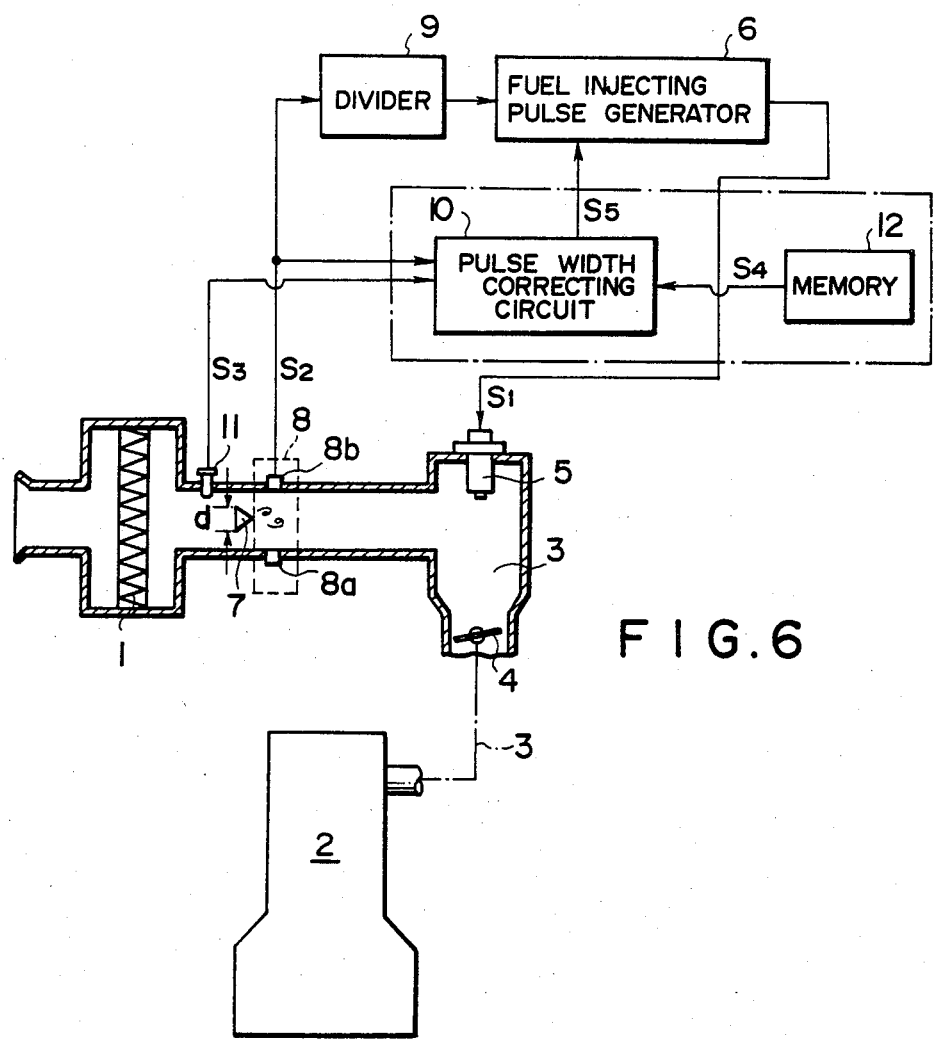
FIG. 6 is a schematic view of a fuel injection control system employing an intake air flow rate detecting device in accordance with an embodiment of the present invention.

FIG. 6 schematically shows a fuel injection control system employing an intake air flow rate detecting device in accordance with an embodiment of the present invention. An air intake passage 3 is connected between an air cleaner 1 and a combustion chamber 2. The air intake passage 3 is provided with a throttle valve 4 for controlling the amount of intake air. Upstream of the throttle valve 4 is mounted a fuel injection valve 5 which is driven by a fuel injecting pulse S1 outputted from a fuel injecting pulse generator 6.

A Karman vortex generator 7 in the form of a prism having a width d is disposed upstream of the fuel injection valve 5 so that Karman vortices are generated downstream of the generator 7. A Karman vortex frequency detector 8 comprising an ultrasonic wave oscillator 8a and an ultrasonic wave receiver 8b is disposed downstream of the Karman vortex generator 7. An ultrasonic wave is generated from the oscillator 8a toward the receiver 8b and when the Karman vortices generated by the Karman trail generator 7 pass across the ultrasonic wave the receiver 8b generates a signal S2 having a frequency f corresponding to the number of the Karman vortices generated. The signal S2 (which will be referred to as "Karman vortex frequency signal" hereinbelow) is inputted into the fuel injecting pulse generator 6 after being divided by a frequency divider 9 and at the same time is inputted into a pulse width correcting circuit 10.

Further, an intake air temperature sensor 11 for detecting the temperature t of intake air is disposed in the air intake passage 3. The intake air temperature sensor 11 outputs a temperature signal S3 which is inputted into the pulse width correcting circuit 10 together with the Karman trail frequency signal S2.

The pulse width correcting circuit 10 reads out a correction value S4, which will be described in detail later, stored in a memory 12 and inputs a pulse width correcting signal S5 into the fuel injecting pulse gererator 6 based on the correction value S4.

The operation of the fuel injection control system of this embodiment will now be described.

The fuel injecting pulse generator 6 generates a plurality of fuel injecting pulses S1 the number of which is changed according to the flow rate Q of intake air as represented by the Karman vortex frequency signal S2 to control the amount of fuel injected from the fuel injection valve 5. The pulse width correcting signal S5 changes the width of each fuel injecting signal S1 thereby correcting the total amount of fuel to be injected from the fuel injection valve 5. The pulse width correcting signal S5 is generated by the compensating means formed by the pulse width correcting circuit 10 and the memory 12 taking into account the flow rate Q and the temperature t of intake air represented by the Karman vortex frequency signal S2 and the temperature signal S3, respectively. A microprocessor such as the Motorola 6801 may be used as the pulse width correcting circuit 10.

Figure 1:
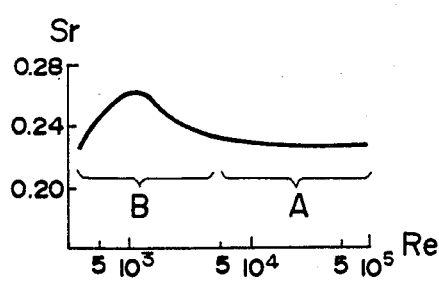
FIG. 1 is a graph showing the relation between Strouhal number and Reynolds number.
Figure 2:
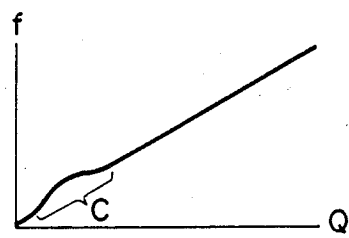
FIG. 2 is a graph showing the relation between the Karman trail frequency and the flow rate of intake air.
Figure 3:
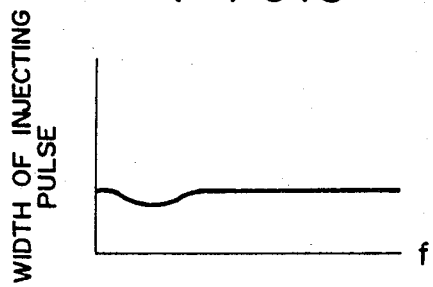
FIG. 3 is a graph illustrating a compensation which has been carried out in a prior art device.
Figure 4:
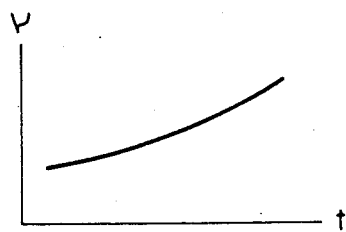
FIG. 4 is a graph showing the relation between the Kinematic viscosity of air and the temperature of the air.
Figure 5:
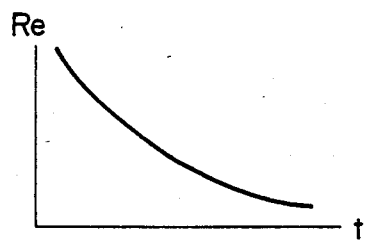
FIG. 5 is a graph showing the relation between Reynolds number and the temperature of intake air.
Figure 7:
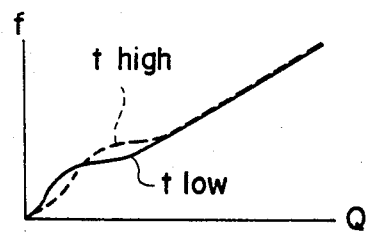
FIG. 7 is a graph illustrating the change in the relation between the Karman vortex frequency and the flow rate of intake air according to the temperature of intake air.
Figure 8:
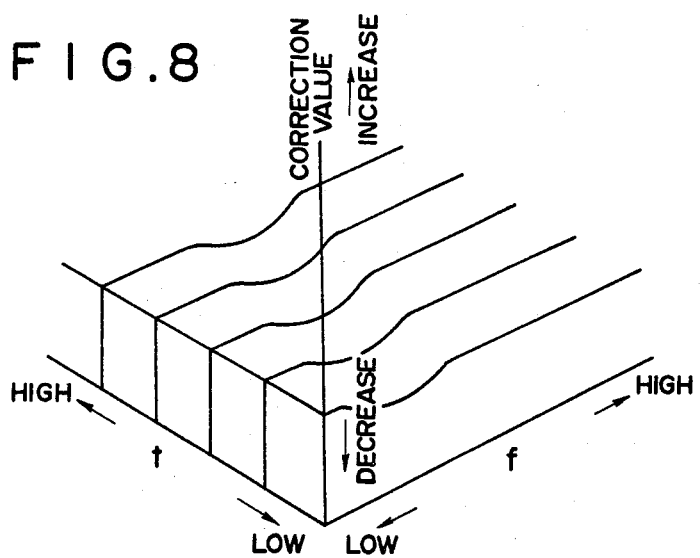
FIG. 8 shows a three-dimensional map for storing the correction values employed in the embodiment of FIG. 6.

When the flow rate Q as represented by the Karman trail frequency signal S2 is in such a range as to give a Reynolds number Re within the region B in FIG. 1 in which the Strouhal number Sr fluctuates, i.e., when the frequency of the Karman vortex frequency signal S2 is in a range in which the proportionality between the Karman vortex frequency f and the flow rate Q is broken (region C in FIG. 2), the fuel injecting pulse S1 must be corrected. However, the location of this region is in accordance with the temperature t of intake air as indicated in FIG. 7. As can be seen from FIG. 7, this region is shifted up toward a higher flow rate Q position as the temperature t of intake air increases. Accordingly, when determining whether or not the flow rate Q represented by the Karman vortex frequency signal S2 is in such a range as to give a Reynolds number within the region B, the shift of the region B resulting from a change in the temperature t of intake air (which affects the Reynolds number Re by way of the kinematic viscosity $\nu$ of intake air) must be taken into account. Therefore, a three-dimensional map as shown in FIG. 8 is stored in the memory 12 and the pulse width correcting circuit 10 reads out an appropriate correction value S4 from the memory 12 based on the flow rate Q as represented by the Karman vortex frequency signal S2 and the temperature t of intake air as represented by the temperature signal S3. The pulse width correcting circuit 10 generates a pulse width correcting signal S5 based on the correction value S4 to correct the width of each fuel injecting pulse S1.

Thus in the fuel injection control system of FIG. 6, the amount of fuel to be injected can be controlled according to the actual flow rate Q of intake air with the fluctuation in the Strouhal number Sr resulting from the changes in the flow rate Q (air flow velocity V) and the kinematic viscosity $\nu$ of intake air being taken into account.

Although in the above embodiment the relevant compensation or the correction is applied to the fuel injection pulse S1, the relevant compensation may be applied directly to the output of the Karman vortex frequency detector 8 before or after said output is inputted into the frequency divider 9. Generally the compensation may be applied to any signal at various stages. That is, the compensation may be applied either to the output signal of the intake air flow rate detecting device or to various control signals generated on the basis of the output signal of the intake air flow rate detecting device. In the former case the output of the Karman vortex frequency detector 8 is compressed when the Karman vortex frequency f is in the said range in which the compensation should be effected. The output of the Karman trail frequency detector 8 must, of course, be inputted into the pulse width correcting circuit 10 without being compensated.

Although in the above embodiment, the output signal of the intake air flow rate detecting device (this term should be broadly interpretted as described above) is compensated only for the fluctuation in the Strouhal number Sr, other various compensations may be effected together therewith.

Figure 9:
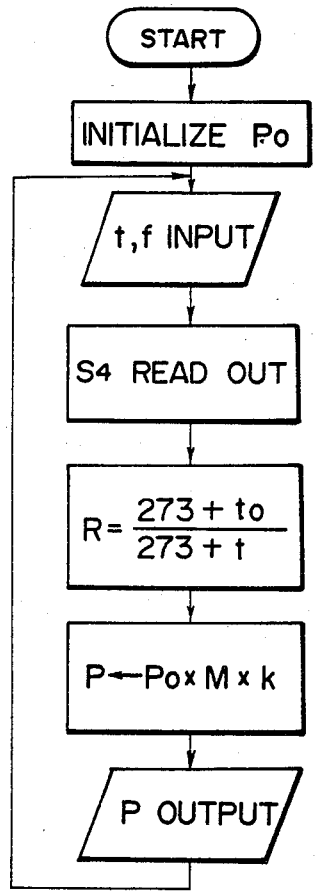
FIG. 9 is a flow chart of the operation of the compensating means employed in another embodiment of the present invention.

FIG. 9 shows a flow chart of the operation of the compensating means in another embodiment of the present invention in which the fluctuation in density of intake air resulting from change in the temperature of the intake air is compensated for in addition to the fluctuation in the Strouhal number Sr.

First the width of the fuel injecting pulse is set at an initial width value $P_0$. Then the temperature t of the intake air and the Karman vortex frequency f are inputted into the compensating means. The compensating means reads out a correction value S4 from the three-dimensional map based on the inputted temperature t and Karman vortex frequency f. A density correction value R ($R=273+t_0/273+t$, $t_0$ being a predetermined value) is then calculated, and said initial width $P_0$ of the fuel injecting pulse is corrected with the correction values S4 and R to obtain the width P of the fuel injecting pulse to be generated. The width P of the fuel injecting pulse thus obtained is inputted into the fuel injecting pulse generator.

We claim:

1. A fuel injection control system for an internal combustion engine having an air intake passage, said fuel injection control system comprising:
   a Karman vortex generator means, disposed in said air intake passage of the engine, for generating Karman vortices;
   a Karman vortex frequency detecting means, comprising an ultrasonic wave oscillator and an ultrasonic wave receiver each disposed downstream of said Karman vortex generator means, for detecting the frequency of the generated Karman vortices;
   a control signal generating means, operably connected to said Karman vortex frequency detecting means, for generating a control signal comprising a plurality of pulses with a predetermined width, said control signal generating means varying the number of said pulses in said control signal in proportion to the detected frequency of the generated Karman vortices, the constant of proportionality being the Strouhal Number which varies with the detected frequency of the generated Karman vortices and the temperature of the intake air;
   a fuel injector means, driven by the control signal generated by said control signal generating means, for injecting fuel into said air intake passage, said fuel injector valve means varying the amount of fuel injected into the air intake passage in response to the number of pulses and the width of the pulses in said control signal;
   an intake air temperature detecting means for detecting the temperature of the intake air;
   a memory means for storing pulse width correction values corresponding to respective combinations of detected frequency of the generated Karman vortices and temperature of intake air so ao to compensate for variations of the Strouhal Number with the detected frequency of the generated Karman vortices and the temperature of the intake air; and
   a pulse width correcting means, operably connected to said Karman vortex frequency detecting means, said intake air temperature detecting means, said control signal generating means and said memory means, for correcting the pulse width of said plurality of pulses in said control signal in accordance with the correction value stored in said memory means for the combination of detected frequency of the generated Karman vortices and temperature of intake air.

2. The fuel injection control system for an internal combustion engine as defined in claim 1, further comprising a compensation means, operably connected to said intake air temperature detecting means and said signal generating means, for varying said pulse width of said plurality of pulses in said control signal in response to the detected air intake temperature so as to compensate for the density variation of air with temperature.

* * * * *